(12) United States Patent
Muñoz Benavente et al.

(10) Patent No.: US 11,437,950 B2
(45) Date of Patent: Sep. 6, 2022

(54) METHOD TO REDUCE SHADING IN A PHOTOVOLTAIC PLANT

(71) Applicant: SOLTEC ENERGÍAS RENOVABLES, SL, Molina de Segura (ES)

(72) Inventors: Irene Muñoz Benavente, Murcia (ES); Javier Guerrero Pérez, Lorca (ES); Jose Alfonso Teruel Hernández, Zarandona (ES)

(*) Notice: Subject to any disclaimer, the term of this patent is extended or adjusted under 35 U.S.C. 154(b) by 110 days.

(21) Appl. No.: 17/059,425

(22) PCT Filed: May 28, 2019

(86) PCT No.: PCT/EP2019/063764
§ 371 (c)(1),
(2) Date: Nov. 27, 2020

(87) PCT Pub. No.: WO2019/229041
PCT Pub. Date: Dec. 5, 2019

(65) Prior Publication Data
US 2021/0218362 A1 Jul. 15, 2021

(30) Foreign Application Priority Data
May 28, 2018 (EP) .................................... 18382368

(51) Int. Cl.
*H02S 20/32* (2014.01)
(52) U.S. Cl.
CPC ..................... *H02S 20/32* (2014.12)
(58) Field of Classification Search
CPC .................................................. H02S 20/32
See application file for complete search history.

(56) References Cited

U.S. PATENT DOCUMENTS

| 4,215,410 A | 7/1980 | Rodrian et al. |
| 8,076,625 B2 | 12/2011 | McDonald |

(Continued)

FOREIGN PATENT DOCUMENTS

| CN | 203465601 U1 | 3/2014 |
| CN | 103149947 | 2/2015 |

(Continued)

OTHER PUBLICATIONS

International Search Report for International Patent Application PCT/EP2019/063764 dated Aug. 8, 2019 and issued by the European Patent Office.

(Continued)

*Primary Examiner* — Jayne L Mershon
(74) *Attorney, Agent, or Firm* — Eugenio J. Torres-Oyola; Victor M. Rodriguez-Reyes; Rafael Rodriguez-Muriel

(57) ABSTRACT

A method for reducing shading in a photovoltaic plant, said photovoltaic plant includes a plurality of solar trackers, made up of one or more photovoltaic panels, arranged in adjacent parallel rows at a given predetermined distance; an actuator, controlled by a tracker controller, which enables each solar tracker to rotate independently regarding the other solar trackers of the row around said North-South axis; and a control system which includes a communication network enabling a bidirectional communication between each tracker controller and a central control unit which controls the photovoltaic plant. The method uses an algorithm executed by a processor of the central control unit, which determines a tilt angle ($\beta$) for each solar tracker in each row inputted in the algorithm, using constant and variable data of each solar tracker, and by selecting either a first ("Morning") or a second configuration ("Afternoon").

11 Claims, 3 Drawing Sheets

(56) References Cited

U.S. PATENT DOCUMENTS

2010/0212653 A1* 8/2010 McDonald ............. F24S 50/20
126/573
2015/0377518 A1* 12/2015 Maxey .................. F24S 50/20
126/714

FOREIGN PATENT DOCUMENTS

| KR | 101746117 B1 | 6/2017 |
|---|---|---|
| WO | 2019010387 A1 | 1/2019 |

OTHER PUBLICATIONS

Written Opinion of the International Searching Authority for International Patent Application PCT/EP2019/063764 made available in WIPO Patentscope dated Dec. 5, 2019 and issued by the European Patent Office.

Non-Patent Publication "Diseño De Una Instalación Fotovoltaica Conectada a Red De 15MWn En Longreach, Australia", authored by Volodymyr Koziy, published Jan. 16, 2017, pp. 1-99, translation provided.

Non-Patent Publication "NX Horizon Self-Powered Tracker", authored by Nextracker, published by Nextracker at www.nextracker.com/wp-content/uploads/2017/12/NHHorizon120.Brochure Apr. 2017.pdf, published Apr. 2017.

Non-Patent Publication "Unlock Your Potential With Truecapture", authored by Nextracker, published by Nextracker at www.nextracker.com/wp-content/uploads/2017/07/NEXT_SellSheet_TrueCapture_FINAL0717.20.pdf, published Jul. 2017.

Non-Patent Publication "Control Algorithms Fir Large-Scale Single-Axis Photovoltaic Trackers", authored by Dorian Schneider, Published by Acta Polytechnica, published May 17, 2012.

Non-Patent Publication "Backtracking Algorithm for Single-Axis Solar Trackers Installed in a Sloping Field" authored by Bruno Nascimento et al., published in the International Journal of Engineering Research and Applications, vol. 5, Issue 12 (Part 4) published Dec. 2015.

Non-Patent Publication "Optimizing Your Energy Yield Truecapture Smart Control Technology Boosts Energy Production and Financial Returns", authored Venkata Abbaraju, published by PR Newswire, published Jun. 27, 2018.

Non-Patent Publication "Ocotillo Wells Solar Project Draft Single Axis Tracker Glare Study", authored by Power Engineers, Inc., prepared for Gildred Building Companies, published Sep. 16, 2013, available at www.sandiegocounty.giv/pds/PC/140124-Supporting-Documents/PDS2012-3300-12-004/Technical-Studies1/15_g=Glare_single_axis_Study pdf.

* cited by examiner

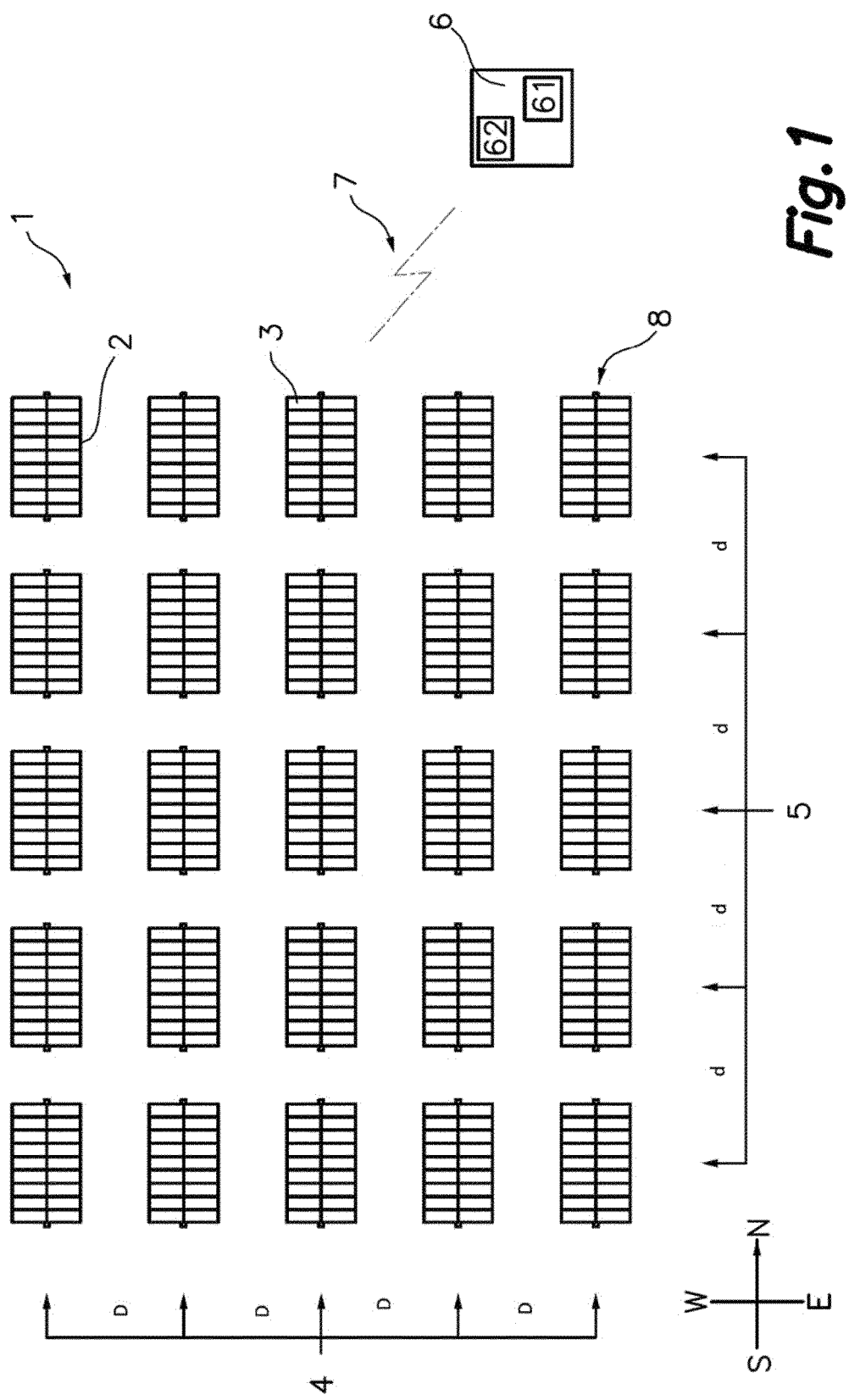

METHOD TO REDUCE SHADING IN A PHOTOVOLTAIC PLANT

TECHNICAL FIELD

The present invention discloses a method implementing an algorithm to eliminate or significantly reduce shading between two or more solar trackers, generally close in a certain area, of a solar photovoltaic (PV) plant to maximize the electrical output (energetic efficiency) of each independent solar tracker and/or the solar photovoltaic plant, maintaining said efficiency level above a predetermined threshold by determining an optimum tilt angle of each solar tracker for any instant between sunrise and sunset (also known as sundown), avoiding or minimizing shadowing between the panels associated to the solar trackers.

The term "solar photovoltaic plant", should be understood herein as an alternative to photovoltaic power station, solar park, solar farm, photovoltaic installation or photovoltaic system, all of which are known used terms in this specific field.

The use of the terms "shadow" and "shade" or "shadowing" and "shading", should be understood herein as having an equivalent meaning, and may be used throughout this document.

Furthermore, the abbreviation/acronym "PV" may be used throughout this document instead of the term "photovoltaic".

STATE OF THE ART

In the past few decades, the use of renewable, sustainable and green energy resources has increased substantially, leading to the development of medium-to-large size scaled solar photovoltaic (PV) plants which have become an alternative source for the generation of electricity, besides the usual main sources, including nuclear power or the use of fossil fuels and derivatives.

These plants usually have a plurality of solar trackers arranged in adjacent parallel rows, at a given predetermined distance, wherein each row comprises a predetermined number of co-aligned solar trackers, around a North-South axis.

One of the main concerns regarding the design and setup of PV plants is the effects that shading can have on both the partial or total efficiency of both individual solar trackers and the PV plant itself. Shading usually occurs due to the proximity between mainly adjacent solar trackers, in order to maximize the use of the terrain available, as well as the particular tilt angle of each solar tracker which panel can cast a shadow on certain portions of surrounding adjacent solar trackers, during certain periods of time whilst tracking the sun.

Therefore, several different methods and systems have been developed in order to reposition the plurality of solar trackers to avoid shading in a PV plant, for instance the use of a controller for controlling the driving means (motor) of a solar energy device (i.e. a solar tracker) to maintain said solar energy device directed towards the sun, is known according to U.S. Pat. No. 4,215,410 A, in which the controller comprises central processor means and a memory for storing a program for controlling the functions of the processor means, as well as data including first positional data, and means for providing additional data such as: day of the year, time and the latitude and longitude where the device is positioned. According to said additional data, the program stored in the memory determines new second positional data for the solar tracker and the amount of movement required to move said solar tracker towards the new position. However, the stored program does not consider inter-device shading factors.

On the other hand, U.S. Pat. No. 8,076,625 B2 discloses a controller system and a method in which a field level tracker controller in communication with solar trackers arranged in a solar energy field receives data regarding the location and physical dimensions of the solar trackers and their electronic arrangement and controls their position. The tracker controller has an algorithm stored in a storage device, which allows the controller to calculate and determine a configuration which allows for an improved sum of the potential power outputs of the solar trackers, also taking into account shade patterns that may be caused by nearby structures including adjacent solar trackers.

CN 103149947 B discloses an anti-shading solar tracking method comprising a plurality of steps, in which one of those steps inputs the amount of shading between adjacent rows in an algorithm to determine the optimum tilt angle of the solar trackers.

Volodymir Koziy in "DESIGN OF A PHOTOVOLTAIC INSTALLATION CONNECTED TO 15MWn NETWORK IN LONGREACH, AUSTRALIA" mentions a backtracking system to avoid shading what happens at first and last hour of the day when the shadow can overcome the distance of separation of the trackers of about 6 meters, and indicates that the system allows a non-optimal tracking of inclination in favour of avoiding the shading of the module, but no further details about said backtracking system are explained in the document.

KR101746117 discloses a back tracking method for a solar module, including satellite information receiver and more particularly relates to a back tracking method for a solar module that can reduce the power generation efficiency by calculating the rotation angle of the solar panel and wherein each solar panel group is rotated in a forward direction and reversely. The system allows a non-optimal tracking of inclination in favor of avoiding the shading of the module.

CN203465601U relates to a solar tracker and a novel flat single-axis solar tracking system. The system comprises three or more solar trackers, each solar tracker comprising two columns, four sensor components and solar panel installation. The document discloses an anti-tracking method based on two states in a first one rotating all the solar trackers in response to one sensor at the east side of the easternmost solar tracker being illuminated, and then introducing corrections in the other solar trackers when an upper sensor of other solar trackers in the east side is illuminated, and in a similar but reverse way rotating all the solar trackers to the west before the sunset.

In the light of the available prior art, the problem related to reduce or eliminate shading in solar plants remains unsolved when the solar plant is deployed on uneven terrain.

BRIEF DESCRIPTION OF THE INVENTION

The present invention discloses a method for eliminating or significantly reducing shading between nearby solar trackers of a solar photovoltaic (PV) plant, by determining an optimum tilt angle for each solar tracker whilst maintaining the energetic electricity output or efficiency above a predetermined threshold.

The method disclosed herein aims to improve on the practices currently known in the state of the art by controlling and determining the optimum tilt angle of each solar tracker included in the PV plant individually, through the use of an algorithm that reduces or eliminates shading between the solar trackers, whilst they are tracking the sun, and maintaining the overall efficiency (electricity output) of individual solar trackers and/or the PV plant above a predetermined threshold taking into account the irregularities of the terrain affecting the rows and columns of solar trackers and in particular taking into account the slopes.

The PV plant comprises in one of the most common arrangements, a plurality of solar trackers (in general of great dimension, for example 45 meters long by four meters wide, supported in two or more vertical supports) arranged in adjacent parallel rows in a north-south (North-South) direction, wherein each solar tracker is made up of one or more PV panels connected electrically in series, parallel or a combination of both. The adjacent parallel rows of the PV plant are positioned at a given predetermined regular distance, in which the predetermined regular distance may be constant throughout the whole extension of the PV plant or the distance between rows may vary. Each row comprises a set or predetermined number of co-aligned solar trackers at a very close distance between each of them along the row, for instance 40 cm. The solar trackers of the PV plant are single axis trackers, preferably Horizontal Single Axis Trackers (HSAT), although other types of single axis or dual axis trackers may also be used.

As well as being made up of one or more PV panels, each solar tracker of each row includes an actuator, or other equivalent means or mechanism, and an associated tracker controller to each solar tracker which enables it to rotate independently, with regards to the other solar trackers of the same row, around a North-South axis whilst tracking the position of the sun for any instant of time between sunrise and sunset. This feature of the solar trackers makes possible that each solar tracker adopts at a moment a specific angle, that can be different to the angle of adjacent solar trackers in a row o column. In addition to this, each solar tracker incorporates an associated controller.

The solution adopted according to this invention is to implement the function of backtracking of the PV plant by means of a control system which establishes a bidirectional communication, through the use of a communication network, between the tracker controller associated with the actuator of each solar tracker and a central control unit which controls the PV plant and performing calculations centrally. This logic seems to be better aligned with the operating strategy of large-scale PV plants. In a preferred embodiment, the control system used is preferably a SCADA (Supervisory Control And Data Acquisition) control system, however any other suitable control system may be used, and the communication network used to enable the bidirectional communication between the plurality of tracker controllers and the central control unit is selected from a group comprising: a hybrid RS-485 and radio communications network or a full mesh radio communications network. The SCADA then estimates, in a centralized manner, the position of each of the trackers each time and is able via a specific command to assign a specific angle to each tracker controller. This reduces the risk of shading especially on very irregular terrain.

Therefore, according to this invention, the central control unit of the PV plant includes a processor which executes an algorithm stored therein which implements a method of centralised control with consecutive steps in which the optimum tilt angles are determined for each solar tracker for any instant of time to avoid shading.

It should be considered that each solar tracker includes several photovoltaic modules connected in series. This means that a partial shadow even of very small extension affects an the entire series. The objective of this invention is avoiding any shading.

Before the steps of the method can begin, data, both constant and variable of each solar tracker, is required to determine the optimum tilt angle ($\beta$) for each solar tracker in each row.

Once the data has been inputted in the algorithm, it can then proceed to determine additional necessary information such as a solar elevation angle ($\mu$) or a solar azimuth angle (Az).

The constant data inputted into the algorithm includes data which is not subject to any variations, such as dimensions of each one of the solar trackers (track width, track length, and track height), distances between solar trackers (such as the distance from a solar tracker to solar trackers in adjoining parallel rows or between solar trackers arranged in the same row), a GPS location, latitude, longitude and altitude coordinates of the solar tracker and a time zone relative to said GPS location of the solar tracker. An important aspect of the proposal of this invention relates to the additional consideration within these constant data of the slope angle ($\alpha$) of the terrain between adjacent solar trackers. The method considers the slope angles ($\alpha$) along an East to West or West to East direction and the slope angles along a North to South and South to North direction.

On the other hand, the variable data inputted in the algorithm includes data such as the position of the sun for any instant of time between sunrise and sunset (Azimuth, Zenith and solar elevation angle), and the present tilt angle ($\beta$) of the solar trackers, for any moment in time.

The use of the slope angle ($\alpha$), is usually necessary for the algorithm to determine the value of the optimum tilt angle ($\beta$) of each solar tracker in photovoltaic plants installed over irregular terrain, due to the plurality of solar trackers being at different heights because the terrain between adjacent solar trackers has slopes and therefore, in order to determine the optimum value of the tilt angle ($\beta$), the algorithm uses at least one slope angle ($\alpha$) relative to the layout of the solar trackers and the terrain characteristics, as seen in FIG. 2b. The use of the slope angle ($\alpha$) could be disregarded in those cases in which the PV plant is installed over relatively flat terrain, as seen in FIG. 2a.

According to the variable data introduced in the algorithm, if the value of the solar elevation angle ($\mu$) is 0° then the solar trackers are in a night mode, indicating that it is still currently night-time and the sun still has not risen over the horizon and therefore the algorithm cannot determine a solar azimuth angle (Az) relative to the position of the sun, until the value of the solar elevation angle ($\mu$) is a value higher than 0°.

Based on the result determined by the algorithm regarding the value of the solar azimuth angle (Az), the algorithm then proceeds to operate in either a first mode, defined as "Morning" set between sunrise and noon in which the trajectory of the sun is ascending, or a second mode, defined as "Afternoon" set between noon and sunset in which the trajectory of the sun is descending based on the position of contiguous solar trackers (in the same row or column) and considering the difference in height between solar trackers involved, i.e. the slope of the terrain in both east to west direction (FIG. 2b) and north to south direction.

The first operating mode ("Morning") of the method of the invention is performed when the value of the solar azimuth angle (Az) is below or equal to 180°, then the solar trackers must be oriented in an easterly direction in order to face the sun, whereas the second operating mode ("Afternoon") is performed when the value of the solar azimuth angle (Az) is above 180°, then the solar trackers must be oriented in a westerly direction in order to face the sun.

The method then proceeds to split or divide the plurality of solar trackers arranged in adjacent parallel rows into a plurality of parallel columns in an East to West (E-W) direction, and vice-versa so that each column includes adjacent parallel solar trackers of each row, and the position and number of columns are then inputted in such way that the information of the solar trackers of each column is inputted by pairs of solar trackers, by scrolling the entire column in one or other of the directions indicated.

In a preferred embodiment the method of the invention provides a run along all the columns of the solar plant in a period of time comprised between 3 and 20 seconds.

Once the information regarding these new columns of solar trackers has been inputted, to determine the optimum value of the tilt angle ($\beta$) for each solar tracker, which is limited to a maximum value set between −90° and +90° with a tolerance or error margin of ±2°. The preferred value of the optimum value of the tilt angle ($\beta$) is set between −60° and +60°, however these values are non-limitative and may vary.

If the processor of the central control unit is operating under said first operating mode ("Morning"), the method of the invention comprises defining the optimum value of the tilt angle ($\beta$) of a westernmost solar tracker of each column, and then determines the optimum value of the tilt angle ($\beta$) for each of the remaining solar trackers of each column to avoid shading among the solar trackers thereof.

Whereas, if the processor of the central control unit is operating under the second operating mode ("Afternoon"), the method of the invention comprises defining the optimum value of the tilt angle ($\beta$) of an easternmost solar tracker of each column, and then determines the optimum value of the tilt angle ($\beta$) for each of the remaining solar trackers in each column to avoid shading among the solar trackers thereof.

It should be noted that when the algorithm initially determines the optimum value of the tilt angle ($\beta$), for any instant of time, an alternative would be to begin with each of the easternmost solar trackers in the first operating mode and each of the westernmost solar trackers in the second operating mode.

In a preferred embodiment of the method, once the optimum value of the tilt angle ($\beta$) has been determined for the first solar tracker of each column, the optimum tilt angle determination of the remaining solar trackers of each column is then successively calculated by the processor.

In those embodiments encompassing a very steep terrain, the limit value for the tilt angle ($\beta$) needed to avoid shading a next one tracker may result in a tracker orientation opposite to the sun. In this case, a stow position will be assigned to that tracker calculating the position of the remaining trackers in the same column. Then, the calculations will be made in a reverse order.

As previously stated, the method of the invention also accounts for the slope angle ($\alpha$) between adjacent trackers in a same row. Moreover, once the trackers have been positioned in given columns, shading may occur, in this case a virtual tracker may be added and a new calculation of the optimum tilt angle ($\beta$) for each of the remaining solar trackers in each column is done starting from that virtual tracker. As well as allowing for a given amount of shading, in a preferred embodiment, when respective optimum tilt angles ($\beta$) for each solar tracker in each column is determined, in either the "Morning" operating mode or for the "Afternoon" operating mode, the method may further comprise adjusting or correcting the value of the optimum tilt angle ($\beta$) by taking into account the shadow projection of solar trackers of immediate adjacent rows and therefore the optimum tilt angle ($\beta$) of any of the solar trackers of a given column is further adjusted. It should be noted that this adjustment or correction of the value of the optimum tilt angle ($\beta$) may be applied when the plurality of columns in the E-W direction are either co-aligned or not co-aligned.

In a preferred alternative embodiment, the method of the invention may comprise adjusting or correcting the value of the optimum tilt angle ($\beta$), instead of the algorithm taking into account the shadow projection of solar trackers of immediate adjacent rows, the optimum tilt angle ($\beta$) of any of the solar trackers of a given column is further adjusted by taking into account the shadow projection corresponding to the solar trackers inside a predetermined area surrounding each solar tracker, to determine the optimum tilt angle ($\beta$) for each solar tracker.

It will be understood that references to geometric position, such as parallel, perpendicular, tangent, etc. allow deviations up to ±5° from the theoretical position defined by this nomenclature.

Other features of the invention appear from the following detailed description of an embodiment.

BRIEF DESCRIPTION OF THE FIGURES

The foregoing and other advantages and features will be more fully understood from the following detailed description of an embodiment with reference to the accompanying drawings, to be taken in an illustrative and non-limitative manner, in which:

FIG. 1 illustrates the general layout of a solar PV plant as seen from above;

DETAILED DESCRIPTION OF AN EMBODIMENT

Figure 2A:
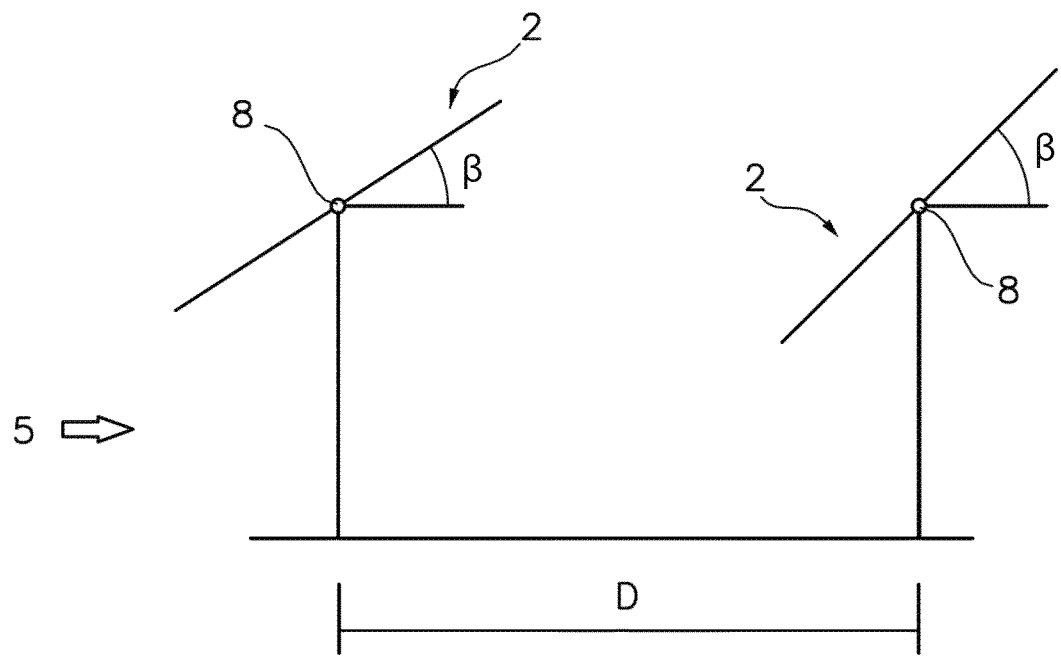
FIG. 2a and FIG. 2b illustrate, respectively, a solar PV plant on relatively flat terrain and on irregular terrain.

The foregoing and other advantages and features will be more fully understood from the following detailed description of an embodiment with reference to the accompanying drawings, to be taken in an illustrative and not limitative, in which:

FIG. 1 illustrates a general layout of a solar photovoltaic plant 1, seen from above, which includes a plurality of solar trackers 2 arranged in adjacent parallel rows 4 and columns 5 at a given predetermined distance (d) between adjacent solar trackers 2 in rows 4 and at a predetermined distance (D) between adjacent solar trackers 2 in columns 5; wherein each row 4 comprises a predetermined number of co-aligned solar trackers 2, around a North-South axis 8. Each solar tracker 2 of each row 4 includes an actuator which enables the solar tracker 2 to rotate independently, from other solar trackers 2, around said North-South axis 8. Each solar tracker 2 includes one or more photovoltaic panels 3.

The photovoltaic plant 1 includes a control system which comprises a communication network 7 enabling a bidirectional communication between each of the tracker controllers associated with the actuator of each solar tracker 2, and a central control unit 6 which controls the photovoltaic plant 1.

The central control unit 6 includes at least a processor 61 and a memory 62 to store an executable algorithm and data relative to the photovoltaic plant 1. When the algorithm is executed by the processor 61, the plurality of parallel rows 4 of solar trackers 2 are divided into a plurality of columns 5 in an East-to-West (E-W) direction, so that each column 5 includes adjacent parallel solar trackers 2 of each row 4.

Figure 2B:
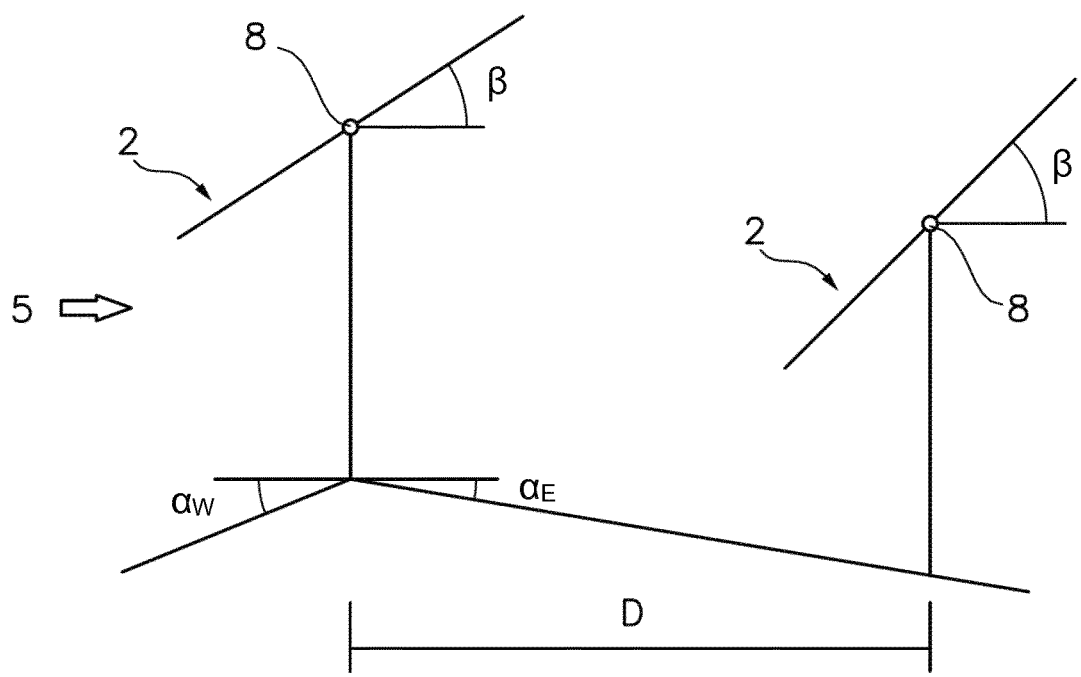

FIG. 2*a* and FIG. 2*b* illustrate a solar photovoltaic plant 1 on both relatively flat terrain and on irregular terrain, in order to better understand the use of slope angles (α), not shown in figures, to be inputted in the algorithm, such as slope angles α in a westerly direction $α_W$ and/or slope angles α in an easterly direction $α_E$, in order to determine the optimum tilt angle (β) of solar trackers 2 in a column 5, wherein adjacent solar trackers 2 in the column 5 are at a predetermine distance D.

Figure 3A:
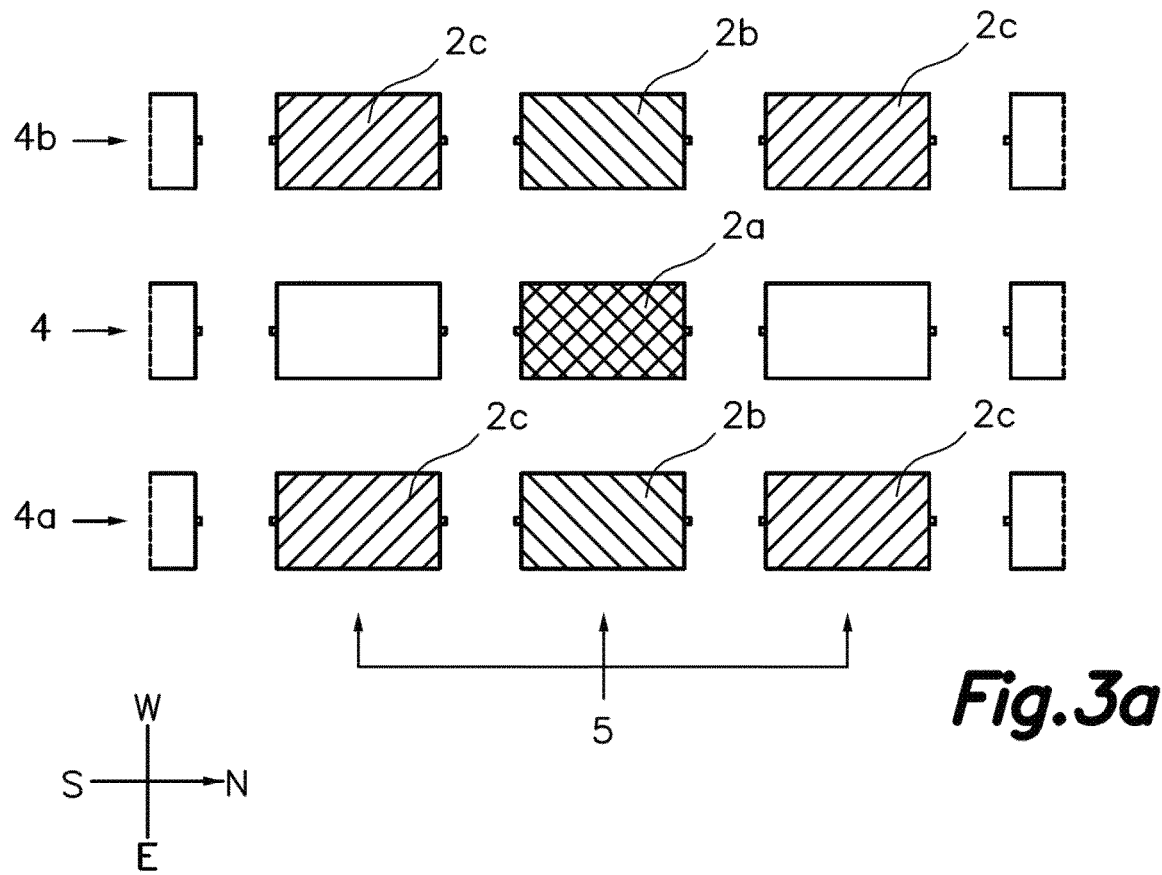
FIG. 3a and FIG. 3b illustrate a portion a solar PV plant as seen from above wherein the parallel columns of solar trackers are arranged in a co-aligned or a non-co-aligned configuration, respectively.
Figure 3B:
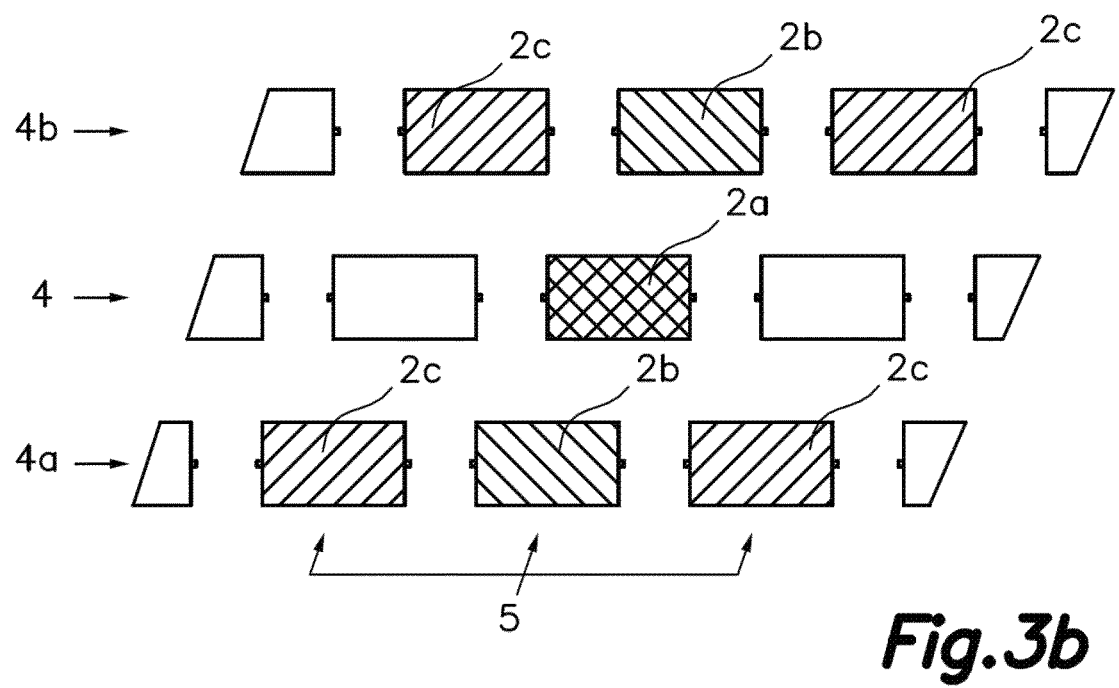

FIG. 3*a* and FIG. 3*b* illustrate, respectively, a portion of a solar photovoltaic plant 1, seen from above, in which the parallel rows 4 of aligned solar trackers 2 are divided or split into parallel columns 5 of solar trackers 2, so that these columns 5 of solar trackers 2 are arranged in a co-aligned (FIG. 3*a*) or a non-co-aligned (FIG. 3*b*) configuration, respectively, according to the disposition of the photovoltaic plant 1 over the extension of the terrain in which it has been setup.

Therefore, FIG. 3*a* and FIG. 3*b* are useful in order to understand certain modifications that may be added to the method of the invention, in which the optimum tilt angle (β) of any of the solar trackers 2 of a given column 5 is further adjusted taking into account the shadow projection of solar trackers 2 of immediate adjacent rows 4.

For example, in both FIG. 3*a* and FIG. 3*b*, if the solar tracker 2*a* is currently in the process of modifying its position in order to achieve its optimum tilt angle (β) as determined, the method of the invention will also take into account the shadow projection cast by solar trackers 2*b* of immediate adjacent rows 4*a* and 4*b* to the east and west respectively, and their immediate adjacent solar trackers 2*c* positioned in a north and south direction to the solar trackers 2*b* of their same row 4*a* and 4*b*.

As stated previously, the plurality of columns 5 of solar trackers 2 in the East-to-West direction may be either co-aligned or non-co-aligned, as seen in FIG. 3*a* and FIG. 3*b* respectively.

In yet a preferred embodiment of the method of the invention wherein one of the solar trackers 2 in the column 5 is set opposite to the sun, the method further comprises assigning a stow position to said solar tracker 2 set opposite to the sun, and calculates the optimum value of the tilt angle (β) of the remaining solar trackers 2 in the column 5 of that solar tracker 2 which stow position was assigned in the previous step.

The embodiments hereby described do embrace those situations where rows 4 columns 5 are completed with solar trackers 2 defining a regular matrix, this means that no gaps or missing solar trackers 2 are to be found in the arrangement set forth in the photovoltaic plant 1 rendering a non-constant value of at least one of the distances (D, d) between adjacent solar trackers 2. In this very case the method of the invention provides adding a virtual solar tracker 2 integrating photovoltaic panels 3 and calculating the optimum value of the tilt angle (β) for each of the remaining solar trackers 2 in each column 5 starting from the optimum value of the tilt angle (β) of that virtual solar tracker 2.

It will be understood that various parts of one embodiment of the invention can be freely combined with parts described in other embodiments, even being said combination not explicitly described, provided there is no harm in such combination.

What is claimed is:

1. A method for reducing shading in a photovoltaic plant, said photovoltaic plant comprising:
   a plurality of solar trackers arranged in:
      parallel rows wherein each row comprises a predetermined number of co-aligned solar trackers at a given predetermined distance (d) between adjacent solar trackers in the row, around a North-South axis, and
      parallel columns at a given predetermined distance (D) between adjacent solar trackers in the column, in a West-to-East or East-to-West orientation, each column including solar tracker having a solar tracker, on at least one side of the column,
   each solar tracker of each row includes an actuator which enables the solar tracker to rotate independently from the other solar trackers of the row around said North-South axis wherein each solar tracker includes an associated tracker controller;
   one or more photovoltaic panels (3) integrated in each solar tracker; and
   a control system which comprises a communication network enabling a bidirectional communication between each tracker controller associated with each actuator of each solar tracker and a central control unit which controls the photovoltaic plant said processor being configured to:
   determine:
      a tilt angle (β) value for each solar tracker in each row using constant and variable data of each solar tracker;
      a solar elevation angle (μ) value according to the variable data, wherein said solar elevation angle (μ) value is 0° when the solar trackers are in a night mode until the solar elevation angle (μ) value is higher than 0°; and
      a solar azimuth angle (Az) value; and
   select between:
      a first operating mode when the solar azimuth angle (Az) value is below or equal to 180°, being the solar trackers oriented in an easterly direction; and
      a second operating mode when the solar azimuth angle (Az) value is above 180°, being the solar trackers oriented in a westerly direction;
   the method comprising calculating:
      an optimum value of the tilt angle (β), to avoid shading among the solar trackers, of a westernmost solar tracker of each column when the processor of the central control unit is operating under said first operating mode, or an easternmost solar tracker of each column when the processor of the central control unit is operating under said second operating mode, and
      the optimum value of the tilt angle (β), to avoid shading among the solar trackers, for each of the remaining solar trackers of each column to avoid shading among the solar trackers thereof, the information of the solar trackers of each column is inputted by pairs of solar trackers, comprising the optimum tilt angle of the or the westernmost solar tracker or easternmost solar tracker of each column, by scrolling the entire column,
   wherein the tilt angle (β) determination comprises taking into account at least one slope angle (α) of the terrain, defined between adjacent solar trackers being arranged at different heights.

2. The method according to claim 1, wherein the constant data used to determine the optimum tilt angle (β) comprises:
- dimensions of the solar tracker,
- the slope angle (α),
- distances (D, d) between solar trackers in adjoining respective parallel rows and columns,
- a time zone relative to said GPS location of the solar tracker, and
- a GPS location, latitude, longitude and altitude, of the solar tracker.

3. The method according to claim 1, wherein the variable data used to determine the optimum tilt angle (β) further comprises data related to the position of the sun at a certain moment.

4. The method according to claim 1, wherein the slope angle (α) between solar trackers is either:
- an east slope angle (αE) wherein the slope angle (α) between two adjoining parallel solar trackers is in an eastern direction, or
- a west slope angle (αW) wherein the slope angle (α) between two adjoining parallel solar trackers is in a western direction, or
- a north-south slope angle (α) or a south-north slope angle (α) between solar trackers in a same row.

5. The method according to claim 1, wherein the tilt angle (β) is limited to a maximum tilt angle (β) value defined between −90° and +90°, with a tolerance margin between −2° and +2°.

6. The method according to claim 5, wherein the tilt angle (β) is limited to a maximum tilt angle (β) value defined between −60° and +60°, with a tolerance margin between −2° and +2°.

7. The method according to claim 1, wherein one of the solar trackers in the column is set opposite to the sun, the method comprising:
- assigning a stow position to said solar tracker set opposite to the sun, and
- calculating the optimum value of the tilt angle (β) of the remaining solar trackers in the column of that solar tracker which stow position was assigned in the previous step.

8. The method according to claim 1, wherein the value of the distance (D, d) between adjacent solar trackers is not constant, the method further comprising:
- adding a virtual solar tracker integrating photovoltaic panels, and
- calculating the optimum value of the tilt angle (β) for each of the remaining solar trackers in each column starting from the optimum value of the tilt angle (β) of that virtual solar tracker.

9. The method according to claim 1, wherein the optimum tilt angle (β) of any of the solar trackers is further adjusted taking into account the optimum tilt angle (β) of each adjacent solar tracker.

10. The method according to claim 1, wherein the communication network between the plurality of tracker controllers and the central control unit is a bidirectional communication network.

11. The method according to claim 10, wherein the communication network is a hybrid RS-485 and radio communications network or a full mesh radio communications network.

* * * * *